United States Patent
Vercier et al.

(10) Patent No.: US 12,235,129 B2
(45) Date of Patent: Feb. 25, 2025

(54) CALIBRATION METHOD FOR A MICROMACHINED INERTIAL ANGLE SENSOR AND CALIBRATION SYSTEM

(71) Applicant: THALES, Courbevoie (FR)

(72) Inventors: Nicolas Jean-Marc Frédéric Vercier, Valence (FR); Bernard Chaumet, Chatellerault (FR)

(73) Assignee: THALES, Courbevoie (FR)

( * ) Notice: Subject to any disclaimer, the term of this patent is extended or adjusted under 35 U.S.C. 154(b) by 252 days.

(21) Appl. No.: 18/085,391

(22) Filed: Dec. 20, 2022

(65) Prior Publication Data
US 2023/0204387 A1 Jun. 29, 2023

(30) Foreign Application Priority Data

Dec. 23, 2021 (FR) ........................... 21 14368

(51) Int. Cl.
*G01C 25/00* (2006.01)
(52) U.S. Cl.
CPC ................. *G01C 25/005* (2013.01)
(58) Field of Classification Search
CPC ................. G01C 25/005; G01C 19/5719
See application file for complete search history.

(56) References Cited

U.S. PATENT DOCUMENTS

2010/0058831 A1* 3/2010 Jeanroy ............. G01C 19/567
73/1.82

FOREIGN PATENT DOCUMENTS

EP 2 960 625 12/2015

OTHER PUBLICATIONS

Search Report for FR2114368, dated Aug. 2, 2022, 1 page.
Cheng et al., "A Digital Calibration Technique of MEMS Gyroscope for Closed-Loop Mode-Matching Control", Micromachines, vol. 10, No. 8, Jun. 25, 2019, p. 496.
Ezekwe et al, "A Mode-Matching Closed-Loop Vibratory Gyroscope Readout Interface With a 0.004/s/ Noise Floor Over a 50 Hz Band", IEEE Journal of Solid-State Circuits, IEEE, vol. 43, No. 12, Dec. 1, 2008, pp. 3039-3048.
Anonymous Ed, "IEEE Recommended Practice for Inertial Sensor Test Equipment, Instrumentation, Data Acquisition, and Analysis", Jan. 1, 2005, IEEE Standard, pp. 1-103.

* cited by examiner

*Primary Examiner* — David Z Huang
(74) *Attorney, Agent, or Firm* — NIXON & VANDERHYE (57) ABSTRACT

The method for calibrating a micromachined inertial angle sensor (2) comprising a support, at least one vibrating mass movable relative to the support, at least one transducer for exciting vibrating movement of the vibrating mass, at least one transducer for detecting a vibration of the vibrating mass, and at least one electrostatic transducer being capable of applying an adjustable electrostatic stiffness to the vibrating mass, the calibration method comprising the steps of the angle sensor receiving a predetermined vibrational excitation emitted by an excitation device (18) separate from the excitation transducer; the detection transducer measuring the vibration of the vibrating mass to obtain a measurement signal ($S_m$) from said measurement by the detection transducer; and transforming; determining, adjusting, and applying the electrostatic stiffness.

15 Claims, 4 Drawing Sheets

CALIBRATION METHOD FOR A MICROMACHINED INERTIAL ANGLE SENSOR AND CALIBRATION SYSTEM

CROSS-REFERENCE TO RELATED APPLICATIONS

This application is a U.S. non-provisional application claiming the benefit of French Application No. 21 14368, filed on Dec. 23, 2021, which is incorporated herein by reference in its entirety.

FIELD

The present invention relates to a method for calibrating a micromachined inertial angle sensor.

The present invention also relates to a calibration system configured to calibrate a micromachined inertial angle sensor.

The invention relates to the field of on-board inertial angle sensors, in particular for navigation, piloting, guidance or heading search.

BACKGROUND

Such an inertial angle sensor is configured to measure an angular position, usually called a gyroscope, or to measure an angular velocity, usually called a gyrometer.

Such sensors are known as such, for example from EP 2 960 625 A1 of the applicant. Such a sensor includes excitation, detection, and often balancing means. In the sensor, the masses are generally excited to vibrate in a plane formed by X- and Y-axes. This plane is perpendicular to a Z-axis which forms a so-called sensitive axis of the sensor. When the sensor is rotated about its sensitive axis, a composition of the vibration of the moving masses with an angular rotation vector generates forces due to the Coriolis effect, which cause the moving masses to vibrate naturally perpendicular to the excitation vibration and the sensitive axis. The amplitude of this natural vibration is proportional to the speed of rotation of the sensor and allows a value of the angular velocity around the sensitive axis to be deduced.

If a mass of such a sensor has an imbalance caused by manufacturing tolerances, for example, the measurement is, in some cases, liable to be disturbed and is therefore not entirely correct.

Solutions have been proposed to address this problem, such as laser treatment to as remove material.

Other solutions aim to add additional elements inside the sensor to allow imbalance compensation by mechanical means.

Still other solutions offer direct control of the excitation means. However, such control is difficult to implement, as it depends on a large number of parameters, such as temperature, pressure, etc.

These solutions can be improved further, as they are difficult to implement and/or do not increase the reliability of the inertial angle sensor measurement to a satisfactory degree.

SUMMARY

Thus, it is an object of the present invention to obtain a method of calibrating a micromachined inertial angle sensor that is simple to implement, while achieving satisfactory measurement accuracy of the sensor.

To this end, the subject-matter of the invention is a method for calibrating a micromachined inertial angle sensor comprising a support, at least one vibrating mass movable relative to the support, at least one excitation transducer for exciting a vibrating movement of the vibrating mass, at least one detection transducer for detecting a vibration of the vibrating mass, and at least one electrostatic transducer capable of applying an adjustable electrostatic stiffness to the vibrating mass, the calibration method comprising the steps of:

- the angle sensor receiving a predetermined vibrational excitation from an excitation device;
- the detection transducer measuring the vibration of the vibrating mass, to obtain a measurement signal based on said measurement by the detection transducer;
- converting the measurement signal over a predetermined time window of said measurement signal into a power spectral density;
- determining at least one value, called noise value, as a function of a portion of said power spectral density comprising a frequency less than or equal to a predetermined frequency;
- adjusting the electrostatic stiffness, by a feedback loop receiving as input the noise value and providing as output a control signal to the electrostatic transducer comprising the electrostatic stiffness to be applied to the vibrating mass that minimises the noise value, preferably minimising the amplitude of the noise value;
- the electrostatic transducer applying the electrostatic stiffness according to the control signal.

The calibration method allows a very simple and reliable calibration of the inertial angle sensor, as the adjustment by the feedback loop at least reduces or even cancels the sensitivity of the angle sensor to vibrations, especially to linear and acoustic vibrations. In particular, this compensates for an imbalance in the sensor mass(es) that would cause such sensitivity.

Also, the calibration according to the calibration method is particularly reliable since the noise value has only low frequencies related to the presence of an imbalance of the sensor mass(es) when receiving the predetermined vibrational excitation.

In other beneficial aspects of the invention, the calibration method comprises one or more of the following features, taken in isolation or in any technically possible combination:

- the excitation device is separate from the excitation transducer;
- the angle sensor comprises at least two vibrating masses movable with respect to the support, and movable with respect to each other, suspended by suspension springs from fixed anchoring points of the support and coupled together by coupling springs to vibrate in phase opposition, the angle sensor comprising, respectively for each vibrating mass, at least one excitation transducer, and at least one detection transducer, the measuring step comprising the measurement of the vibration of each vibrating mass by the respective detection transducer, the measuring signal being obtained from the measurement of the vibration of each vibrating mass;
- the angle sensor comprises at least one electrostatic transducer for each vibrating mass respectively; and the adjusting step comprises supplying, to each electrostatic transducer, the control signal for applying the respective electrostatic stiffness to each vibrating mass that minimises the noise value;

the control signal comprises, for each vibrating mass, a different electrostatic stiffness with respect to each other to take into account an imbalance of the vibrating masses;

one of the vibrating masses is referred to as the outer mass, and the other of the vibrating masses is referred to as the inner mass; and, in the adjusting step, the feedback loop provides the control signal comprising electrostatic stiffnesses generating a force determined as follows:

$$(Kti - Kte)\frac{(Xi + Xe)}{2} + \frac{Kti + Kte}{2}(Xi - Xe),$$

where:
Kti is a sum of electrostatic stiffnesses to be applied to the inner mass, Kte is a sum of electrostatic stiffnesses to be applied to the outer mass, Xi is a displacement of the inner mass, and Xe is a displacement of the outer mass;

this force cancels out the following so-called disturbing forces:

$$(Mi - Me)\frac{(\ddot{X}i + \ddot{X}e)}{2} \text{ and } (Ki - Ke)\frac{(Xi + Xe)}{2},$$

where Mi is the mass of the inner mass, Me is the mass of the outer mass, $\ddot{X}i$ is the acceleration of the inner mass, $\ddot{X}e$ is the acceleration of the outer mass, Ki is a sum of stiffnesses of said suspension springs connecting the inner mass to the support, and Ke is a sum of stiffnesses of said suspension springs connecting the outer mass to the support;

the measuring step comprises the or each detecting transducer measuring the vibration of the or each vibrating mass along a first axis in a plane of the support, and an additional detecting transducer measuring, for the or each vibrating mass, the vibration of the or each vibrating mass along a second axis perpendicular to the first axis and included in said plane;

the control signal comprises the electrostatic stiffness to be applied along the first axis by the or each electrostatic transducer, for the or each vibrating mass, the control signal further comprising the electrostatic stiffness to be applied along the second axis by an additional electrostatic transducer, for the or each vibrating mass;

the applying step comprises applying the respective electrostatic stiffness by the or each electrostatic transducer along the first axis, and by the or each additional electrostatic transducer along the second axis, in accordance with the control signal;

the calibration method comprises at least one repetition of the steps of receiving, measuring, processing, determining, adjusting, and applying;

during the repetition, the control signal comprises an electrostatic stiffness to be applied in a direction, in the plane of the support, distinct from the first axis and the second axis;

the control signal further comprises an electrostatic stiffness to be applied by an electrostatic transducer for compensation of a quadrature bias, the quadrature bias corresponding to a stiffness coupling of the suspension springs along the first axis and the second axis;

the excitation device comprises at least one of a loudspeaker, a piezoelectric element and a vibration generator;

the noise value is equal to an arithmetic average of a plurality of power spectral density values at frequencies less than or equal to 0.1 Hz.

The invention also relates to a calibration system configured to calibrate a micromachined inertial angle sensor comprising a support, at least one vibrating mass movable relative to the support, at least one excitation transducer for exciting a vibrating movement of the vibrating mass, at least one detection transducer for detecting a vibration of the vibrating mass, and at least one electrostatic transducer capable of applying an adjustable electrostatic stiffness to the vibrating mass, the calibration system comprising an excitation device configured to emit a predetermined vibrational excitation to the inertial angle sensor, and the calibration system further comprising a computing device comprising:

a reception module configured to receive a measurement signal obtained from a measurement of the vibration of the vibrating mass by the detection transducer;

a transformation module configured to transform the measurement signal over a predetermined time window of said measurement signal into a power spectral density;

a determination module configured to determine at least one value, called noise value, as a function of a portion of said power spectral density comprising a frequency less than or equal to a predetermined frequency;

a feedback loop configured to adjust the electrostatic stiffness, the feedback loop being configured to receive as input the noise value and provide as output a control signal to the electrostatic transducer comprising the electrostatic stiffness to be applied to the vibrating mass that minimises the noise value, preferably minimising the amplitude of the noise, and a transmission module configured to transmit the control signal to the inertial angle sensor so as to apply the electrostatic stiffness by the electrostatic transducer in accordance with the control signal.

BRIEF DESCRIPTION OF THE DRAWINGS

These characteristics and advantages of the invention will become apparent upon reading the following description, given only as a nonlimiting example, referring to the attached drawings, in which.

DETAILED DESCRIPTION

Figure 1:
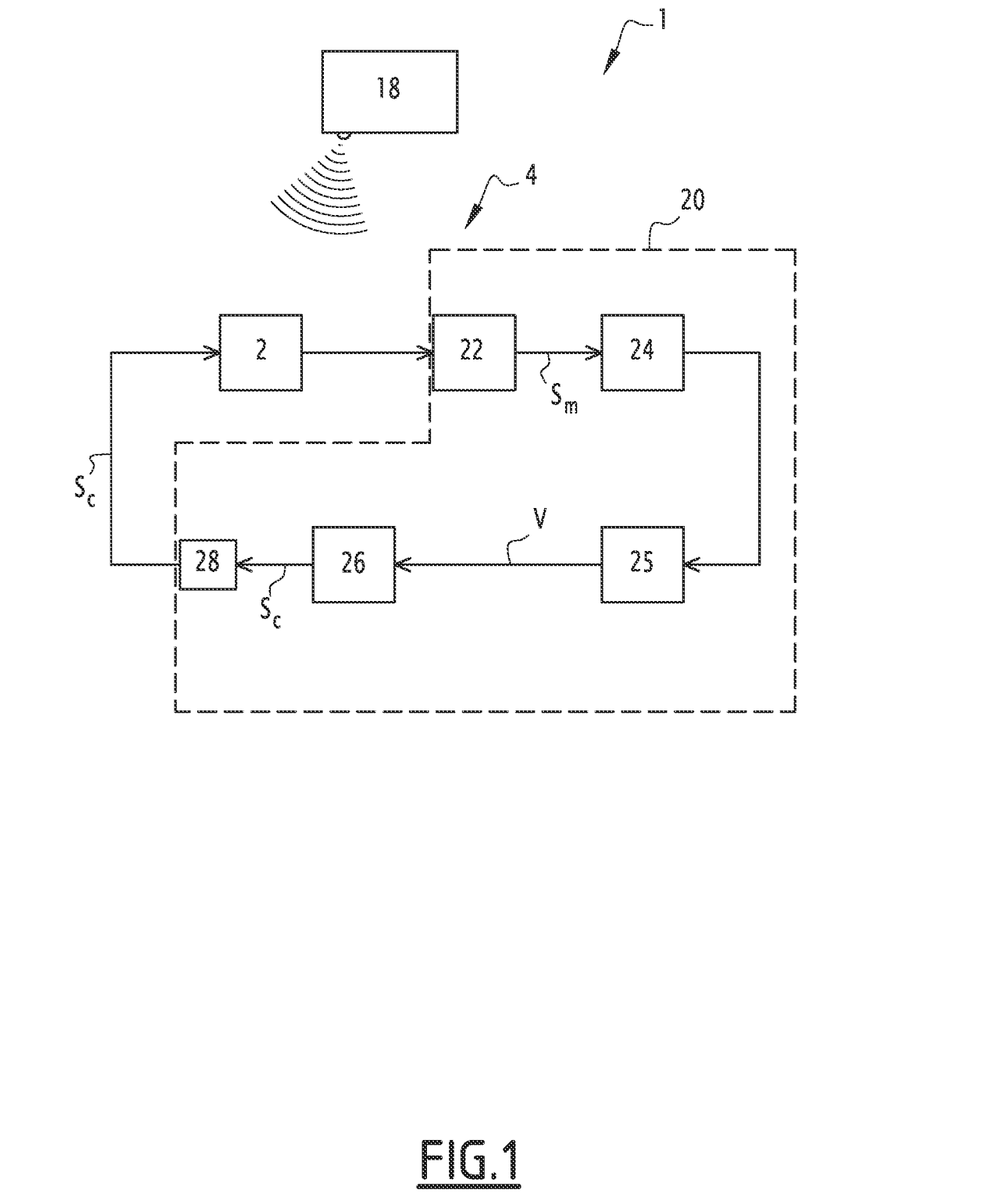
FIG. 1 is a schematic view of an assembly comprising an inertial angular sensor and a calibration system according to the invention.

In FIG. 1, an assembly 1 comprises a micromachined inertial angle sensor 2 and a calibration system 4 configured to calibrate the angle sensor 2. Hereafter, the micromachined inertial angle sensor 2 is referred to as the angle sensor 2.

The angle sensor 2 is for example a gyrometer configured to measure an angular velocity. Alternatively or additionally, the angle sensor 2 is a gyroscope for measuring an angular position.

The angle sensor 2 is a micromachined sensor, and thus forms a microelectromechanical system, also defined by its acronym MEMS (Microelectromechanical Systems).

In particular, the angle sensor 2 is a sensor intended to be carried in a vehicle, not shown, for example in an aircraft, a drone or a ship.

The angle sensor 2 is for example intended for use in a vehicle navigation, steering, or guidance system.

The angle sensor 2 is in particular a tuning fork gyro, particularly a tuning fork gyro with two vibrating masses.

"Vibrating mass" means that the mass is capable of oscillating, for example driven by means described below, and by the Coriolis effect when the angle sensor 2 is rotated.

Figure 2:
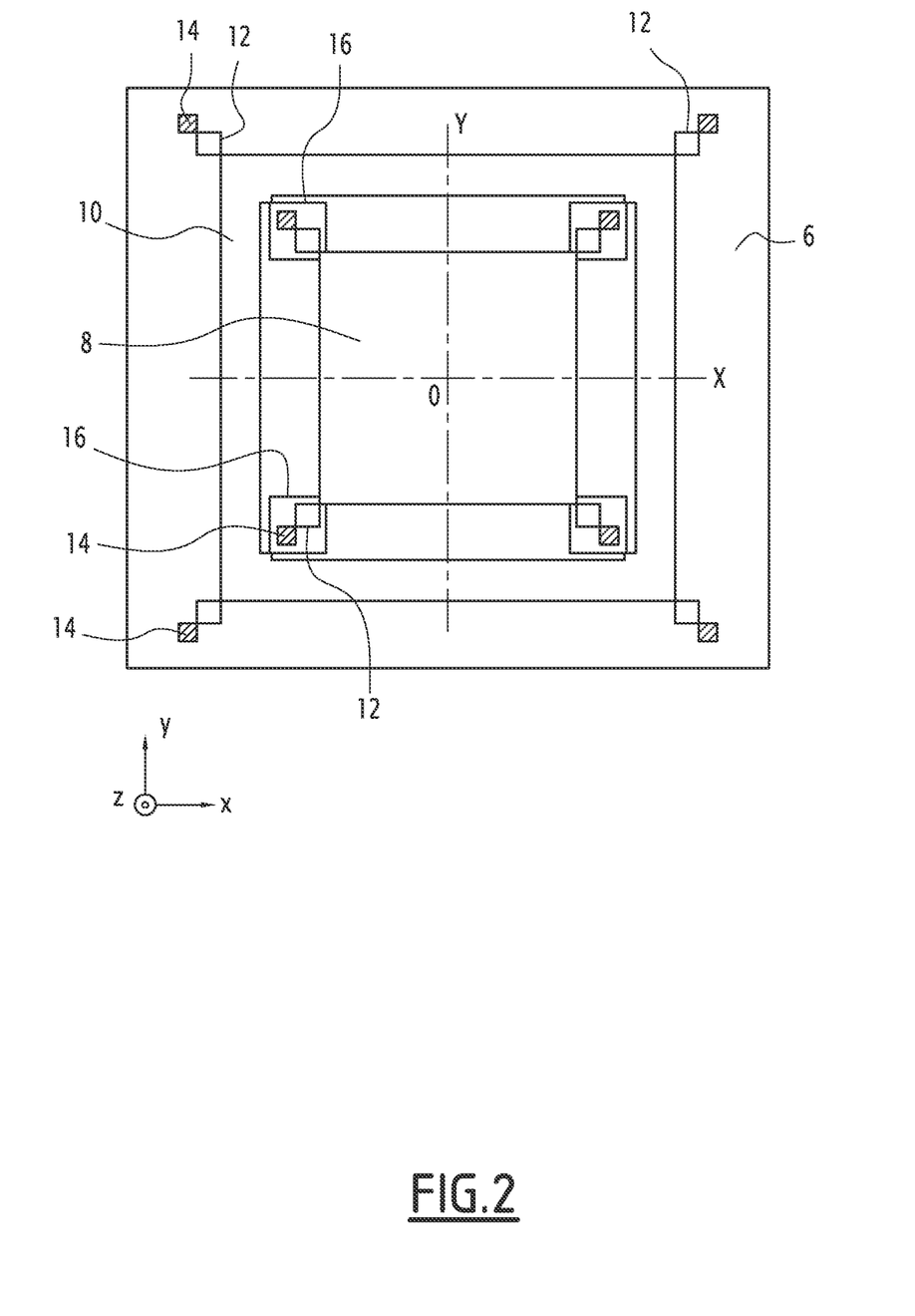
FIG. 2 is a schematic view of an example inertial angular sensor of FIG. 1.
Figure 3:
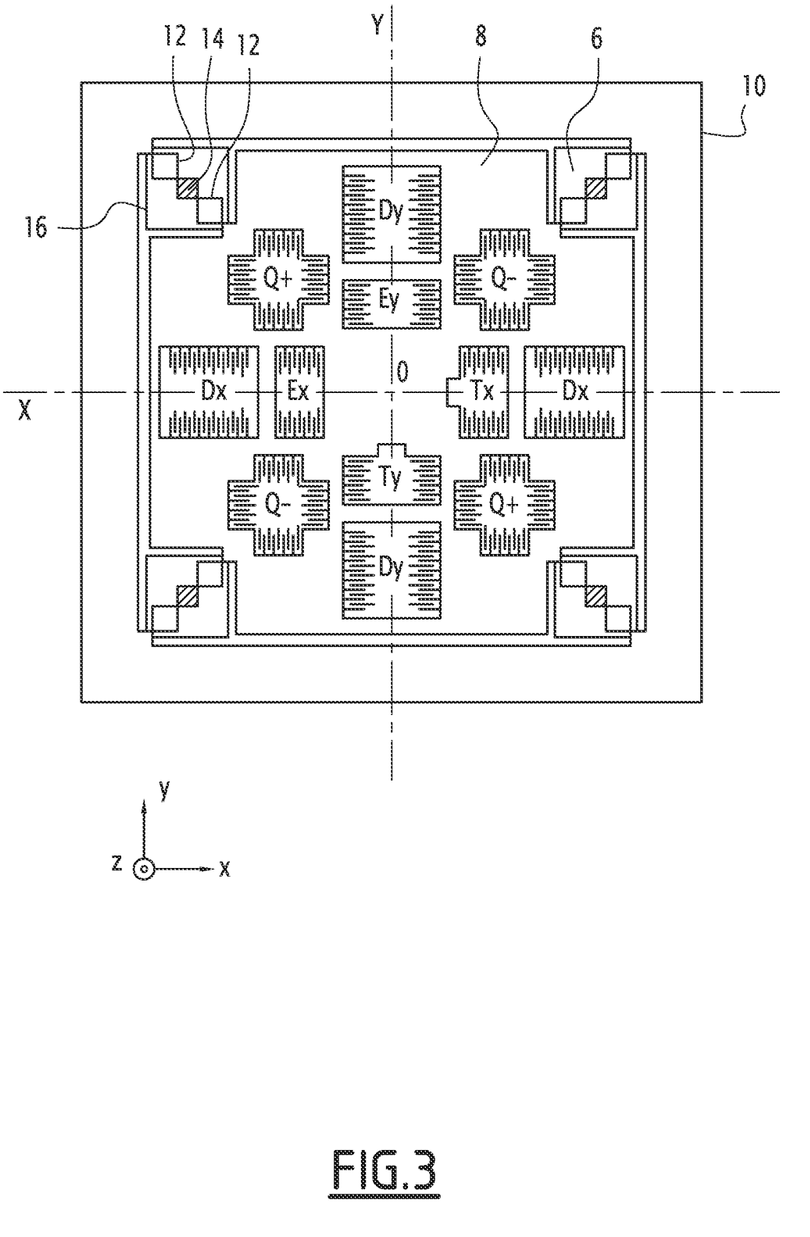
FIG. 3 is a schematic view of another example inertial angular sensor of FIG. 1.

With reference to the examples in FIGS. 2 and 3, the angle sensor 2 comprises a support 6 extending in a plane of the support 6 along a first axis X and a second axis Y perpendicular to the first axis X.

The angle sensor 2 comprises at least one vibrating mass 8, 10, preferably two vibrating masses 8, 10 arranged around each other, to form a so-called inner mass 8 and an outer mass 10.

The vibrating masses 8, 10 are movable relative to the support 6, and movable relative to each other. In particular, the centres of gravity 0 of the vibrating masses 8, 10 coincide when at rest.

The angle sensor 2 comprises suspension springs 12, for example four for each vibrating mass 8, 10, suspending each vibrating mass 8, 10 from a respective anchor point 14 which is fixed relative to the support 6.

The angle sensor 2 further comprises coupling springs 16, for example four when the angle sensor 2 comprises two masses 8, 10, coupling the vibrating masses 8, 10 to each other to allow vibration of the masses 8, 10 in phase opposition.

The example of the angle sensor 2 in FIG. 3 differs from the example in FIG. 2 in that, in FIG. 3, the suspension springs 12 of the outer mass 10 are oriented towards the inner mass 8 and fixed to the same anchor points 14 as the corresponding suspension springs 12 of the inner mass 8.

The angle sensor 2 further comprises, particularly visible in FIG. 3, at least one excitation transducer Ex, Ey of a vibrating motion of the vibrating mass 8, 10, at least one detection transducer Dx, Dy of a vibration of the vibrating mass 8, 10, and at least one electrostatic transducer Tx, Ty adapted to apply an adjustable electrostatic stiffness to the vibrating mass 8, 10

The fact that the static stiffness is "adjustable" indicates that the electrostatic transducer Tx, Ty is capable of changing the electrostatic stiffness.

The angle sensor 2 preferably further comprises at least one electrostatic quadrature bias compensation transducer Q+, Q− configured to compensate for a quadrature bias. The quadrature bias corresponds to a coupling of a stiffness of the suspension springs 12 along the first axis X and the second axis Y.

For the sake of visibility, the transducers Ex, Ey, Dx, Dy, Tx, Ty, Q+ and Q− are not shown in FIG. 2. Preferably, the angle sensor 2 according to the example in FIG. 2 comprises the same transducers as in the example in FIG. 3.

An example of the arrangement of the transducers Ex, Ey, Dx, Dy, Tx, Ty, Q+ and Q− is described in the following with reference to FIG. 3.

The angle sensor 2 comprises for example an excitation transducer Ex configured to excite the inner mass 8 along the first axis X, and an excitation transducer Ey configured to excite the inner mass 8 along the second axis Y in particular during an operation of the angle sensor 2 for example to obtain an angular velocity.

The angle sensor 2 comprises for example two detection transducers Dx configured to detect the vibration of the inner mass 8 along the first axis X, and two detection transducers Dy for such detection along the second axis Y.

The angle sensor 2 further comprises an electrostatic transducer Tx capable of applying the adjustable electrostatic stiffness to the inner mass 8 along the first axis X, and a corresponding electrostatic transducer Ty for the second axis Y, also called the additional electrostatic transducer.

The angle sensor 2 comprises, for example, two Q+ compensating electrostatic transducers configured to compensate for a positive quadrature bias, and two Q− compensating electrostatic transducers configured to compensate for a negative quadrature bias.

In FIG. 3, the transducers Ex, Ey, Dx, Dy, Tx, Ty, Q+ and Q− are shown only for the inner mass 8. Preferably, the angle sensor 2 further comprises at least one and preferably each transducer Ex, Ey, Dx, Dy, Tx, Ty, Q+ and Q− for the outer mass 10 as well. For example, each transducer Ex, Ey, Dx, Dy, Tx, Ty, Q+ and Q− is as described in EP 2 960 625 A1.

Each transducer Ex, Ey, Dx, Dy, Tx, Ty, Q+ and Q− is in particular a transducer comprising interdigitated combs. These interdigitated combs comprise a mobile comb rigidly connected to the inner mass 8, in particular fixed with respect to the inner mass 8, and a comb rigidly connected to the support 6, in particular fixed with respect to the support 6.

Each transducer Ex, Ey, Dx, Dy, Tx, Ty, Q+ and Q− is configured either to apply a force to the inner mass 8, based on a received voltage, or to detect movement of the inner mass 8 by measuring changes in load between the fixed and moving combs.

The calibration system 4 comprises an excitation device 18 configured to emit a predetermined vibrational excitation to the angle sensor 2, and a computing device 20.

The excitation device 18 comprises for example a loudspeaker, a piezoelectric element and/or a vibration generator.

The excitation device 18 is for example configured to emit to the angle sensor 2 a vibrational excitation of a frequency range centred around a resonant frequency of the excitation device 18, for example of a frequency range equal to +/−2 k Hz relative to the resonant frequency.

The resonant frequency of the excitation device 18 is a predetermined frequency.

For example, the excitation device 18 is integrated into a calibration bench, not shown, allowing the angle sensor 2 to be positioned at a predetermined position for calibration by receiving the vibrational excitation.

According to another example, the excitation device 18 is attached to the angle sensor 2, for example by being arranged together with the angle sensor 2 in a single housing. This allows, for example, a self-calibration of the angle sensor 2.

In some examples, the excitation device 18 is arranged outside or inside the angle sensor 2. In an example not shown, the excitation device 18 is integrated into the angle sensor 2.

The computing device 20 comprises a reception module 22, a transformation module 24, a determination module 25, a feedback loop 26 and a transmission module 28.

The reception module 22, the transformation module 24, the determination module 25, the feedback loop 26 and the transmission module 28 are each integrated in at least one computer.

In this case, each of the reception module 22, the transformation module 24, the determination module 25, the feedback loop 26 and the transmission module 28 is at least partly in the form of software that can be executed by a processor and stored in a memory of the computer.

In a variant or in addition, each of the reception module 22, the transformation module 24, the determination module 25, the feedback loop 26, and the transmission module 28 is at least partially integrated into a physical device, such as a programmable logical component, such as a FPGA ("Field-Programmable Gate Array"), or as a dedicated integrated circuit, such as an ASIC ("Application-Specific Integrated Circuit").

The reception module 22 is configured to receive a measurement signal $S_m$ obtained from a measurement of the vibration of the vibrating mass 8, 10 by each detection transducer Dx, Dy.

The transformation module 24 is configured to transform the measurement signal $S_m$ over a predetermined time window of that measurement signal $S_m$ into a power spectral density.

The determination module 25 configured to determine at least one value, called noise value V, as a function of a portion of said power spectral density comprising a frequency less than or equal to a predetermined frequency. This portion in particular has a frequency lower than or equal to the predetermined frequency.

The predetermined frequency is, for example, 0.1 Hz.

In other examples, the predetermined frequency has a value greater than or less than 0.1 Hz.

The feedback loop 26 is configured to adjust the electrostatic stiffness to be applied by each electrostatic transducer Tx, Ty to the vibrating mass 8, 10.

The feedback loop 26 is configured to receive as input the noise value V and to output a control signal $S_c$ to the electrostatic transducer Tx, Ty comprising the electrostatic stiffness to be applied to the vibrating mass 8, 10 to minimise the noise value V. Preferably, the feedback loop 26 is configured to output the control signal $S_c$ that minimises the amplitude of the noise value V.

The transmission module 28 is configured to transmit the control signal $S_c$ to the angle sensor 2 to each electrostatic transducer Tx, Ty to apply the electrostatic stiffness in accordance with the control signal $S_c$.

Figure 4:
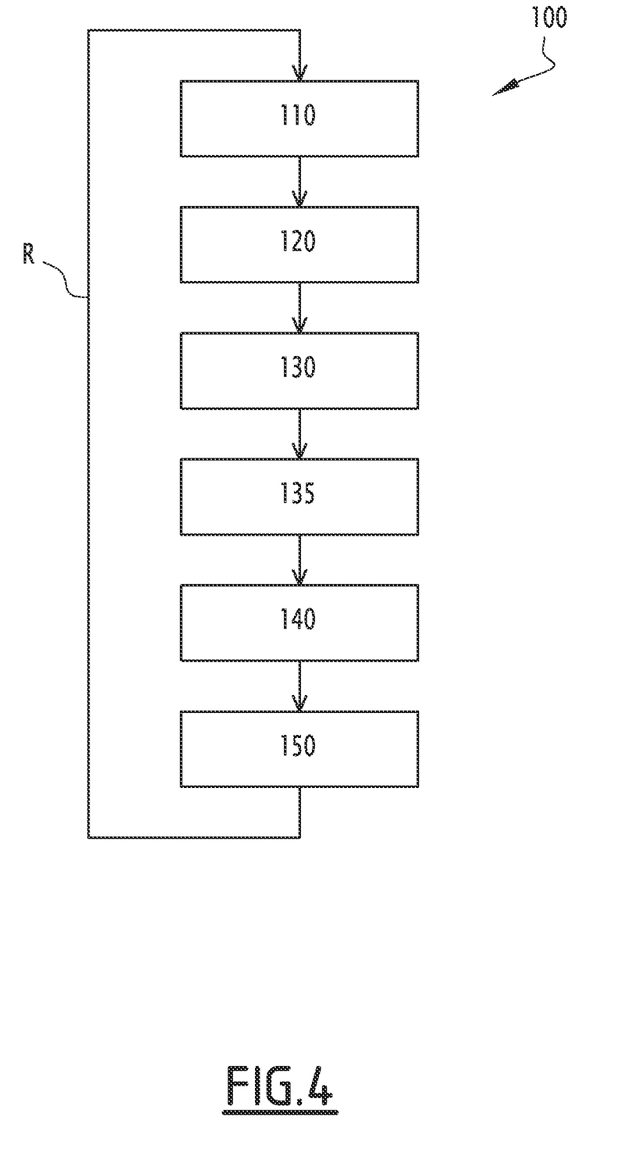
FIG. 4 is a flowchart of a calibration method implemented by the calibration system of FIG. 1.

A calibration method 100 for the angle sensor 2 is now described, with reference to FIG. 4 showing a flowchart of this method.

The calibration method 100 comprises a receiving step 110, a measuring step 120, a transforming step 130, a determining step 135, an adjusting step 140 and an applying step 150.

In the receiving step 110, the angle sensor 2 receives the predetermined vibrational excitation from the excitation device 18 which is separate from the excitation transducer Ex, Ey.

Each vibrating mass 8, 10 is subjected to different forces in the receiving step 110. An example is described below.

Each vibrating mass 8, 10 is subjected to return forces by the suspension springs 12 connecting each vibrating mass 8, 10 to the support 6. The suspension springs 12 generate a sum of stiffnesses Ki applied to the inner mass 8 and a sum of stiffnesses Ke applied to the outer mass 10.

The sum of stiffnesses Ki applied to the inner mass 8 by the suspension springs 12 of the inner mass 8 is for example defined as follows:

$$Ki = \begin{bmatrix} Kxi & Kxyi \\ Kxyi & Kyi \end{bmatrix},$$

where
Kxi is the stiffness along the first axis X generated by the suspension springs 12 connecting the inner mass 8 to the support 6;
Kyi is the stiffness along the second axis Y generated by the suspension springs 12 connecting the inner mass 8 to the support 6;
Kxyi represents the quadrature stiffness forming a coupling between the first axis X and second axis Y.

The sum of stiffnesses Ke applied to the outer mass 10 is defined in an equivalent way, with the index e instead of i:

$$Ke = \begin{bmatrix} Kxe & Kxye \\ Kxye & Kye \end{bmatrix}.$$

In addition, we define:

$$Xi = \begin{bmatrix} xi \\ yi \end{bmatrix}$$

as the displacement of the inner mass 8, and $$Xe = \begin{bmatrix} xe \\ ye \end{bmatrix}$$

as that of the outer mass 10.

Each vibrating mass 8, 10 is also subjected to forces generated by the electrostatic transducers Tx, Ty. The electrostatic transducers Tx, Ty generate a sum of stiffnesses Kti applied to the inner mass 8 and a sum of stiffnesses Kte applied to the outer mass 10.

The sum of stiffnesses Kti applied to the inner mass 8 is for example defined as follow:

$$Kti = \begin{bmatrix} Ktxi & Ktxyi \\ Ktxyi & Ktyi \end{bmatrix},$$

Ktxi is the stiffness along the first axis X generated by the or each electrostatic transducer Tx along the X axis;
Ktyi is the stiffness along the first axis X generated by the or each electrostatic transducer Ty along the Y axis.

The sum of stiffnesses Kte applied to the outer mass 10 is defined in an equivalent way, with the index e instead of i.

For example, the inner mass 8 is subjected to an oscillating force $F_{oscillant}$ which is defined as follows:

$Mi \cdot \ddot{X}i + Ki \cdot Xi = F_{oscillant}$, where

Mi is the mass of the inner mass 8;
$\ddot{X}i$ is the acceleration of the inner mass 8.
Similarly, the outer mass 10 has, for example, an oscillating force $F_{oscillant}$ which is defined as follows:

$Me \cdot \ddot{X}e + Ke \cdot Xe = F_{oscillant}$, where

Me is the mass of the outer mass 10;

$\ddot{X}e$ is the acceleration of the outer mass 10.

The skilled person will understand that these definitions of the oscillating forces are simplified definitions which disregard certain forces, for example coupling forces between the internal and outer mass 8, 10, Coriolis forces, and differences in the excitation force applied to each mass.

From the first terms $Mi \cdot \ddot{X}i$ and $Me \cdot \ddot{X}e$ of the oscillating force equations $F_{oscillant}$ for each mass 8, 10, we have:

$$Mi.\ddot{X}i - Me.\ddot{X}e = (Mi - Me)\frac{(\ddot{X}i + \ddot{X}e)}{2} + \frac{Mi + Me}{2}(\ddot{X}i - \ddot{X}e).$$

In particular, this equation has a phase acceleration $$\frac{(\ddot{X}i + \ddot{X}e)}{2},$$

the average acceleration of the two masses 8, 10, associated with the mass difference (Mi−Me) and an opposite phase acceleration ($\ddot{X}i-\ddot{X}e$), associated with the average mass $$\frac{Mi + Me}{2}.$$

We now consider the second terms $Ki \cdot Xi$ and $Ke \cdot Xe$ of the oscillating force equations $F_{oscillant}$ for each mass 8, 10. These terms relate to the forces generated by the suspension springs 12 connecting the inner 8 and outer 10 masses to the support 6.

The movement $$\frac{(Xi + Xe)}{2}$$

described below is driven by the excitation device 18.

We have:

$$\begin{bmatrix} Kxi & Kxyi \\ Kxyi & Kyi \end{bmatrix}\begin{bmatrix} xi \\ yi \end{bmatrix} - \begin{bmatrix} Kxe & Kxye \\ Kxye & Kye \end{bmatrix}\begin{bmatrix} xe \\ ye \end{bmatrix} =$$

$$Ki.Xi - Ke.Xe = (Ki - Ke)\frac{(Xi + Xe)}{2} + \frac{Ki + Ke}{2}(Xi - Xe)$$

That is:

$$\frac{Mi + Me}{2}(\ddot{X}i - \ddot{X}e) + \frac{Ki + Ke}{2}(Xi - Xe) =$$

$$-(Mi - Me)\frac{(\ddot{X}i + \ddot{X}e)}{2} - (Ki - Ke)\frac{(Xi + Xe)}{2}.$$

In the reception step 110, the movement of the inner and outer mass 8, 10 has in particular two disturbing forces $$(Mi - Me)\frac{(\ddot{X}i + \ddot{X}e)}{2} \text{ and } (Ki - Ke)\frac{(Xi + Xe)}{2},$$

related to a difference of the masses 8, 10 and a difference of the sums of the stiffnesses of the suspension springs 12.

In particular, these disturbing forces are reduced, preferably cancelled, by the feedback loop 26 in the adjusting step 140, described later.

In the measurement step 120, the or each detection transducer Dx, Dy measures the vibration of the vibrating mass 8, 10, to obtain the measurement signal $S_m$ from the measurement by the or each detection transducer Dx, Dy.

The measurement signal $S_m$ is in particular a signal at the output of the angle sensor 2, for example an angular velocity or an angular position.

For example, the angle sensor 2 determines an angular velocity corresponding to the measurement signal $S_m$, depending on the amplitude of the vibration of the vibrating mass 8, 10.

For example, when the angle sensor 2 is a gyroscope, the measurement signal $S_m$ is a measurement of the direction of vibration of the vibrating mass 8, 10, in the plane of the support 6, measured by the detection transducers Dx, Dy. For example, each detection transducer Dx, Dy measures the amplitude of the vibration along the corresponding X and Y axis, and the angle sensor 2 obtains the measurement signal $S_m$ from these measurements.

When the angle sensor 2 is a gyrometer, the measurement signal $S_m$ is, for example, proportional to excitation forces applied by the or each excitation transducer Ex, Ey. The angle sensor 2 determines these excitation forces in particular on the basis of the measurement of the vibration of the vibrating mass 8, 10 by the or each detection transducer Dx, Dy.

For example, the measurement step 120 comprises the measurement by the detection transducer Dx of the vibration of the inner mass 8 along the first axis X, and the measurement by the detection transducer Dy, also called additional detection transducer, of the vibration of the inner mass 8 along the second axis Y.

According to one example, the measurement step 120 comprises measurements along any direction in the plane of the support 6, in particular different from the X or Y axis.

In particular, this vibration corresponds to the displacement referred to as Xi above and possibly its first and/or second order derivatives.

Preferably, the measurement step 120 further comprises measuring the vibration of the outer mass 10 along the first axis X and the second axis Y by the corresponding detection transducers, not shown.

In particular, this vibration corresponds to the displacement referred to as Xe above and possibly its first and/or second order derivatives.

In the case of two masses, namely the inner mass 8 and the outer mass 10, the measuring step 120 comprises in particular measuring a movement of each mass 8, 10 along the first axis X, and along the second axis Y. For example, the angle sensor 2 determines the measurement signal $S_m$ from the difference in movement, in particular in phase opposition, between the inner mass 8 and the outer mass 10 along the first axis X, and the difference in movement between these masses 8, 10 along the second axis Y.

According to one example, the angle sensor 2 determines a resulting direction of vibration of each vibrating mass 8, 10, in the plane of the support 6, from the measurements of the detection transducers Dx and Dy, to obtain the measurement signal $S_m$.

In the transformation step 130, the transformation module 24 transforms the measurement signal $S_m$ over a predetermined time window of this measurement signal $S_m$ into a power spectral density.

The power spectral density is in particular the power spectral density of the measurement signal $S_m$.

The transformation module 24 obtains the power spectral density, for example by applying the periodogram method to the measurement signal $S_m$.

The power spectral density shows the frequency distribution of the power of the measurement signal $S_m$ according to the frequencies of this signal. For example, the power spectral density has the unit:

$$\frac{°/s}{\sqrt{\text{Hz}}},$$

where
- °/s is the rotational velocity obtained by measurement by the angle sensor 2 in degrees per second; and
- Hz is the frequency in Hertz.

In the determination step 135, the determination module 25 determines the noise value V, based on a portion of the power spectral density comprising a frequency less than or equal to the predetermined frequency, for example 0.1 Hz.

This portion in particular has a frequency lower than or equal to the predetermined frequency.

For example, the determination module 25 determines the arithmetic mean of each value of the power spectral density less than or equal to the predetermined frequency to obtain the noise value V.

In another example, the determination module 25 determines an Allan variance to obtain the noise value V.

According to one example, the determination module 25 determines a plurality of noise values V, corresponding for example to different measurement directions in the plane of the support 6.

In the adjusting step 140, the feedback loop 26 adjusts the electrostatic stiffness to be applied to each ground 8, 10.

"Electrostatic stiffness" is understood to mean a stiffness which is constant over a predetermined period of time and which is applied to the vibrating mass 8, 10, in particular constant over a period of time which is several orders of magnitude longer than an oscillation period of the predetermined vibrational excitation generated by the excitation device 18.

According to one example, the electrostatic stiffness depends on a direction in the plane of the support 6 formed by the X and Y axes and/or on a temperature of the angle sensor 2.

The feedback loop 26 receives as input the noise value V and provides as output the control signal $S_c$ to each electrostatic transducer Tx, Ty comprising the electrostatic stiffness to be applied to the respective vibrating mass 8, 10, that minimises the noise value V.

Preferably, the feedback loop 26 minimises the amplitude of the noise value V by providing the control signal $S_c$.

In particular, the feedback loop 26 implements a negative feedback that tends to reduce the noise value V.

For example, the control signal $S_c$ comprises a different electrostatic stiffness for each vibrating mass 8, 10 to account for an imbalance of the vibrating masses 8, 10, preferably a different stiffness along the X-axis with respect to the Y-axis.

In the example of an angle sensor 2 with the two vibrating masses 8, 10, the imbalance is the difference in mass between the vibrating masses 8 and 10.

The control signal $S_c$ comprises, for example, the electrostatic stiffness to be applied in the X-axis by the electrostatic transducer Tx, and the electrostatic stiffness to be applied in the Y-axis by the additional electrostatic transducer Ty, for each vibrating mass 8, 10.

For example, the control signal $S_c$ further comprises an electrostatic stiffness to be applied by each electrostatic quadrature bias compensation transducer Q+, Q−.

For example, the feedback loop 26 provides the control signal $S_c$ comprising electrostatic stiffeners generating a force determined as follows:

$$(Kti - Kte)\frac{(Xi + Xe)}{2} + \frac{Kti + Kte}{2}(Xi - Xe).$$

In particular, this determined force minimises, and preferably cancels, the following disturbing forces:

$$(Mi - Me)\frac{(\ddot{X}i + \ddot{X}e)}{2} \text{ and } (Ki - Ke)\frac{(Xi + Xe)}{2}.$$

In the application step 150, the electrostatic transducer Tx, Ty applies the electrostatic stiffness according to the control signal $S_c$.

In particular, the electrostatic transducer Tx applies the respective electrostatic stiffness along the X-axis, and the electrostatic transducer Ty along the Y-axis, according to the control signal Se.

The electrostatic transducers Tx, Ty cancel out the diagonal terms of the disturbing forces in particular, by applying the following stiffnesses:

$$(Kti - Kte)\frac{(Xi + Xe)}{2} = \begin{bmatrix} Ktxi - Ktxe & 0 \\ 0 & Ktyi - Ktye \end{bmatrix}\frac{(Xi + Xe)}{2}.$$

For example, each electrostatic compensation transducer Q+, Q− applies the respective electrostatic stiffness according to the control signal $S_c$.

The electrostatic compensation transducers Q+, Q− cancel out the non-diagonal terms of the disturbing forces.

For example, the calibration method 100 is repeated several times, as illustrated in particular by arrow R in FIG. 4.

For example, when repeating the calibration method 100, the excitation device 18 continuously emits a predetermined vibrational excitation to the angle sensor 2.

After a first execution of steps 110, 120, 130, 135, 140 and 150 and the application of the electrostatic stiffness in accordance with the control signal $S_c$, the noise value V, and in particular its amplitude, is reduced in a second execution compared to the first execution.

Preferably, the calibration method 100 is repeated until a predetermined value of the noise value V is obtained.

According to one example, the calibration method 100 comprises at least one repetition of the steps of receiving 110, measuring 120, transforming 130, determining 135, adjusting 140, and applying 150.

For example, the control signal $S_c$ comprises an electrostatic stiffness to be applied in a direction, in the plane of the support 6, which is distinct from the first axis X and the second axis Y.

For example, the calibration method 100 comprises the implementation of several repetition of the steps of receiving 110, measuring 120, transforming 130, determining 135, adjusting 140, and applying 150. In this case, in a given repetition, the control signal $S_c$ comprises an electrostatic stiffness to be applied in a first direction that is distinct from a second direction. The second direction corresponds in particular to the direction of the electrostatic stiffness to be applied in a previous repetition. The first and second directions are in the plane of the support 6, and have for example a predetermined angle between them, such as 10°.

Of course, other embodiments than those described above can be envisaged.

For example, the angle sensor 2 is a different sensor from the one described above. For example, the angle sensor 2 comprises only one or more than two vibrating masses.

The calibration system 4 and the calibration method 100 according to the invention have a large number of advantages.

In particular, the calibration system 4 and the calibration method 100 allow a calibration of the angle sensor 2 which is simple to implement due to the excitation by the excitation device 18 which is separate from the excitation transducer Ex, Ey, and due to the adjustment from the output measurement of the angle sensor 2.

Also, calibration by the method according to the invention makes it possible to obtain a good measurement accuracy of the angle sensor 2, because the low frequency noise of the measurement of the angle sensor 2 is reduced by the feedback implemented by the feedback loop 26.

In the example where the sensor receives a predetermined vibrational excitation from an excitation device which is separate from the excitation transducer, the implementation of the calibration method is particularly simple, as it is sufficient to position the angle sensor for example in a predefined area to receive this excitation for calibration, especially in the absence of added compensation elements inside the sensor.

The invention claimed is:

1. A method of calibrating a micromachined inertial angle sensor comprising a support, at least one vibrating mass movable relative to the support, at least one excitation transducer for exciting a vibrating movement of the vibrating mass, at least one detection transducer for detecting a vibration of the vibrating mass, and at least one electrostatic transducer capable of applying an adjustable electrostatic stiffness to the vibrating mass, the calibration method comprising the steps of:
    receiving, by the angle sensor, a predetermined vibrational excitation emitted from an excitation device;
    measuring, by the detection transducer, the vibration of the vibrating mass, to obtain a measurement signal based on the measurement by the detection transducer;
    converting the measurement signal over a predetermined time window of said measurement signal into a power spectral density;
    determining at least one value, called noise value, as a function of a portion of said power spectral density comprising a frequency less than or equal to a predetermined frequency;
    adjusting the electrostatic stiffness, by a feedback loop receiving as input the noise value and providing as output a control signal to the electrostatic transducer comprising the electrostatic stiffness to be applied to the vibrating mass that minimises the noise value;
    applying, by the electrostatic transducer, the electrostatic stiffness according to the control signal.

2. The calibration method according to claim 1, wherein the excitation device is separate from the excitation transducer.

3. The calibration method according to claim 1, wherein the angle sensor comprises at least two vibrating masses movable relative to the support, and movable relative to each other, suspended by suspension springs from fixed anchoring points of the support and coupled together by coupling springs to vibrate in phase opposition, the angle sensor comprising, respectively for each vibrating mass, at least one excitation transducer and at least one detection transducer;
    wherein the measuring step comprises measuring the vibration of each vibrating mass by the respective detection transducer, the measurement signal being obtained from the measurement of the vibration of each vibrating mass.

4. The calibration method according to claim 3, wherein the angle sensor comprises at least one electrostatic transducer for each vibrating mass respectively; and
    wherein the adjusting step comprises supplying, to each electrostatic transducer, the control signal for applying the respective electrostatic stiffness to each vibrating mass that minimises the noise value.

5. The calibration method according to claim 4, wherein the control signal comprises, for each vibrating mass, a different electrostatic stiffness with respect to each other to take into account an imbalance of the vibrating masses.

6. The calibration method according to claim 3, wherein one of the vibrating masses is referred to as the outer mass, and the other of the vibrating masses is referred to as the inner mass; and
    wherein, in the adjusting step, the feedback loop provides the control signal comprising electrostatic stiffnesses generating a force determined as follows:

$$(Kti - Kte)\frac{(Xi + Xe)}{2} + \frac{Kti + Kte}{2}(Xi - Xe),$$

where:
    Kti is a sum of electrostatic stiffnesses to be applied to the inner mass,
    Kte is a sum of electrostatic stiffnesses to be applied to the outer mass,
    Xi is a displacement of the inner mass, and
    Xe is a displacement of the outer mass.

7. The calibration method according to claim 6, wherein said force cancels out the following so-called disturbing forces:

$$(Mi - Me)\frac{(\ddot{X}i + \ddot{X}e)}{2} \text{ and } (Ki - Ke)\frac{(Xi + Xe)}{2},$$

where
    Mi is the mass of the inner mass,
    Me is the mass of the outer mass,
    $\ddot{X}i$ is the acceleration of the inner mass,
    $\ddot{X}e$ is the acceleration of the outer mass,
    Ki is a sum of stiffnesses of said suspension springs connecting the inner mass to the support, and
    Ke is a sum of stiffnesses of said suspension springs connecting the outer mass to the support.

8. The calibration method according to claim 1, wherein the measuring step comprises the or each detection transducer measuring the vibration of the or each vibrating mass along a first axis in a plane of the support and an additional detection transducer measuring, for the or each vibrating mass, the vibration of the or each vibrating mass along a second axis perpendicular to the first axis and comprised within said plane.

9. The calibration method according to claim 8, wherein the control signal comprises the electrostatic stiffness to be applied along the first axis by the or each electrostatic transducer, for the or each vibrating mass, the control signal further comprising the electrostatic stiffness to be applied along the second axis by an additional electrostatic transducer, for the or each vibrating mass; and wherein the applying step comprises applying the respective electrostatic stiffness by the or each electrostatic transducer along the first axis, and by the or each additional electrostatic transducer along the second axis, in accordance with the control signal.

10. The calibration method according to claim 9, comprising at least one repetition of the steps of receiving, measuring, transforming, determining, adjusting, applying, wherein, during the repetition, the control signal comprises an electrostatic stiffness to be applied in a direction, in the plane of the support, distinct from the first axis and the second axis.

11. The calibration method according to claim 8, wherein the angle sensor comprises at least two vibrating masses movable relative to the support, and movable relative to each other, suspended by suspension springs from fixed anchoring points of the support and coupled together by coupling springs to vibrate in phase opposition, the angle sensor comprising, respectively for each vibrating mass, at least one excitation transducer and at least one detection transducer;

wherein the measuring step comprises measuring the vibration of each vibrating mass by the respective detection transducer, the measurement signal being obtained from the measurement of the vibration of each vibrating mass, wherein the control signal further comprises an electrostatic stiffness to be applied by an electrostatic transducer for compensation of a quadrature bias, the quadrature bias corresponding to a stiffness coupling of the suspension springs along the first axis and the second axis.

12. The calibration method according to claim 1, wherein the excitation device comprises at least one of a loudspeaker, a piezoelectric element, and a vibration generator.

13. The calibration method according to claim 1, wherein the noise value is equal to an arithmetic mean of a plurality of power spectral density values at frequencies less than or equal to 0.1 Hz.

14. The calibration method according to claim 1, wherein the control signal comprises the electrostatic stiffness to be applied to the vibrating mass that minimises the amplitude of the noise value.

15. A calibration system configured to calibrate a micromachined inertial angle sensor comprising a support, at least one vibrating mass movable relative to the support, at least one excitation transducer for exciting a vibrating movement of the vibrating mass, at least one detection transducer for detecting a vibration of the vibrating mass, and at least one electrostatic transducer capable of applying an adjustable electrostatic stiffness to the vibrating mass, the calibration system comprising an excitation device configured to emit a predetermined vibrational excitation to the inertial angle sensor, and the calibration system further comprising a computing device comprising:

a reception module configured to receive a measurement signal obtained from a measurement of the vibration of the vibrating mass by the detection transducer;

a transformation module configured to transform the measurement signal over a predetermined time window of said measurement signal into a power spectral density;

a determination module configured to determine at least one value, called noise value, as a function of a portion of said power spectral density comprising a frequency less than or equal to a predetermined frequency;

a feedback loop configured to adjust the electrostatic stiffness, the feedback loop being configured to receive as input the noise value and provide as output a control signal to the electrostatic transducer comprising the electrostatic stiffness to be applied to the vibrating mass that minimises the noise value, and a transmission module is configured to transmit the control signal to the angle sensor so as to apply the electrostatic stiffness by the electrostatic transducer in accordance with the control signal.

* * * * *